United States Patent
Arndt

(10) Patent No.: US 7,003,771 B1
(45) Date of Patent: Feb. 21, 2006

(54) LOGICALLY PARTITIONED PROCESSING SYSTEM HAVING HYPERVISOR FOR CREATING A NEW TRANSLATION TABLE IN RESPONSE TO OS REQUEST TO DIRECTLY ACCESS THE NON-ASSIGNABLE RESOURCE

(75) Inventor: Richard Louis Arndt, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1183 days.

(21) Appl. No.: 09/589,663

(22) Filed: Jun. 8, 2000

(51) Int. Cl.
*G06F 9/46* (2006.01)

(52) U.S. Cl. .................................................. 718/104
(58) Field of Classification Search ............... 718/1, 718/100–108
See application file for complete search history.

(56) References Cited

U.S. PATENT DOCUMENTS

| | | | |
|---|---|---|---|
| 5,276,884 A | 1/1994 | Mohan et al. | 395/700 |
| 5,437,033 A | 7/1995 | Inoue et al. | 395/700 |
| 5,996,026 A | 11/1999 | Onodera et al. | 710/3 |
| 6,260,068 B1 * | 7/2001 | Zalewski et al. | 709/226 |
| 2002/0016891 A1 * | 2/2002 | Noel et al. | 711/153 |
| 2002/0016892 A1 * | 2/2002 | Zalewski et al. | 711/153 |

* cited by examiner

*Primary Examiner*—Thomas Lee
*Assistant Examiner*—Kenneth Tang
(74) *Attorney, Agent, or Firm*—Duke W. Yee; Mark E. McBurney; Lisa L. B. Yociss

(57) ABSTRACT

A method, apparatus, and system for preventing each of a plurality of operating system within a logically partitioned data processing system from interfering with the operation of the other operating systems is provided. In one embodiment, a logically partitioned data processing system includes a plurality of logical partitions; a plurality of operating systems, a plurality of assignable resources, at least one non-assignable resource, and a hypervisor. Each of the plurality of operating systems is assigned to a separate one of the plurality of logical partitions and each of the plurality of assignable resources is assigned to one of the plurality of logical partitions. The hypervisor provides a set of services to each of the plurality of logical partitions, wherein these services safely perform modifications to non-assignable processing system resources in response to operating system requests without allowing direct access to the non-assignable resources by the operating system image. Thus, each operating system is prevented from modifying the non-assignable resource in such a way that interferes with the operation of other ones of the plurality of operating systems.

24 Claims, 5 Drawing Sheets

LOGICALLY PARTITIONED PROCESSING SYSTEM HAVING HYPERVISOR FOR CREATING A NEW TRANSLATION TABLE IN RESPONSE TO OS REQUEST TO DIRECTLY ACCESS THE NON-ASSIGNABLE RESOURCE

CROSS REFERENCE TO RELATED APPLICATIONS

The present application is related to co-pending U.S. patent application Ser. No. 09/589,662 entitled "HYPERVISOR FUNCTION SETS" filed Jun. 8, 2000. The content of the above-mentioned commonly assigned, co-pending U.S. Patent applications are hereby incorporated herein by reference for all purposes.

BACKGROUND OF THE INVENTION

1. Technical Field

The present invention relates generally to the field of computer architecture and, more specifically, to methods and systems for managing resources among multiple operating system images within a logically partitioned data processing system.

2. Description of Related Art

A logical partitioning option (LPAR) within a data processing system (platform) allows multiple copies of a single operating system (OS) or multiple heterogeneous operating systems to be simultaneously run on a single data processing system platform. A partition, within which an operating system image runs, is assigned a non-overlapping subset of the platform's resources. These platform allocable resources include one or more architecturally distinct processors with their interrupt management area, regions of system memory, and I/O adapter bus slots. The partition's resources are represented by its own open firmware device tree to the OS image.

Each distinct OS or image of an OS running within the platform are protected from each other, such that software errors on one logical partition cannot affect the correct operation of any of the other partitions. This is provided by allocating a disjoint set of platform resources to be directly managed by each OS image and by providing mechanisms for ensuring that the various images can not control any resources that have not been allocated to it. Furthermore, software errors in the control of an OS's allocated resources are prevented from affecting the resources of any other image. Thus, each image of the OS (or each different OS) directly controls a distinct set of allocable resources within the platform.

A significant problem with logically partitioned platform has been "when" to run trusted platform firmware to create and enforce the partitioning of the platform's resources. In general, there have been two answers. One solution is to run the firmware prior to starting the OS image, at which time special hardware is set up to restrict the access that the OS image can make. The other solution is to run the firmware when certain privileged instructions that may change the environment are trapped (i.e. prevented from executing). Both of these answers have drawbacks. The special hardware solution results in overly constraining the OS image to run in a fixed set of resources that can be managed by the hardware. The trapping on privileged instruction solution tends to create a significant performance penalty since most of the time the trapped instructions were being used for other purposes than to change the OS image's environment.

Therefore, a method of creating and enforcing the partitioning of a platform's resources that allows for the significant flexibility in the assignment of resources of the instruction trap approach, and that also maintains a level of performance more closely associated with the hardware approaches is desirable.

SUMMARY OF THE INVENTION

The present invention provides a method, apparatus, and system for preventing each of a plurality of operating system within a logically partitioned data processing system from interfering with the operation of the other operating systems. In one embodiment, a logically partitioned data processing system includes a plurality of logical partitions; a plurality of operating systems, a plurality of assignable resources, at least one non-assignable resource, and a hypervisor. Each of the plurality of operating systems is assigned to a separate one of the plurality of logical partitions and each of the plurality of assignable resources is assigned to one of the plurality of logical partitions. The hypervisor provides a set of services to each of the plurality of logical partitions, wherein these services safely perform modifications to non-assignable processing system resources in response to operating system requests without allowing direct access to the non-assignable resources by the operating system image. Thus, each operating system is prevented from modifying the non-assignable resource in such a way that interferes with the operation of other ones of the plurality of operating systems.

BRIEF DESCRIPTION OF THE DRAWINGS

The novel features believed characteristic of the invention are set forth in the appended claims. The invention itself, however, as well as, a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
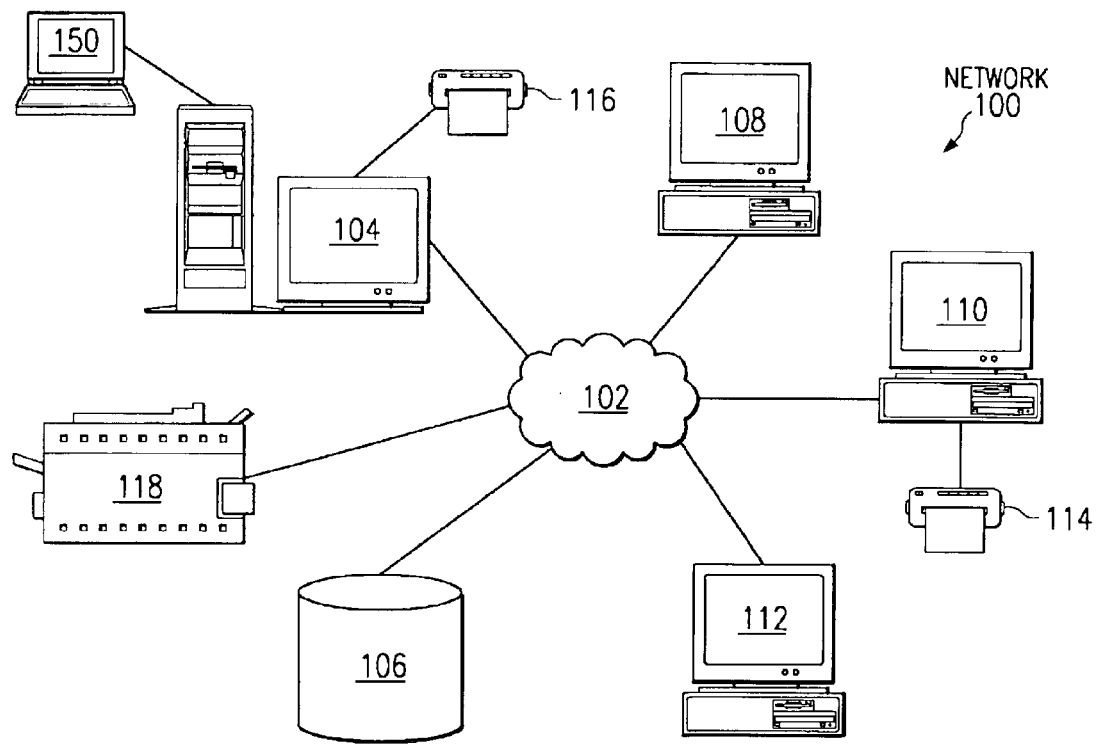
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to hardware system console 150. Server 104 is also connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network. In the depicted example, server 104 is a logically partitioned platform and provides data, such as boot files, operating system images and applications, to clients 108–112. Hardware system console 150 may be a laptop computer and is used to display messages to an operator from each operating system image running on server 104, as well as to send input information, received from the operator, to server 104. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data-processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages of course, distributed data processing system 100 also may be implemented as a number of different types of networks such as, for example, an intranet or a local area network.

FIG. 1 is intended as an example and not as an architectural limitation for the processes of the present invention.

Figure 2:
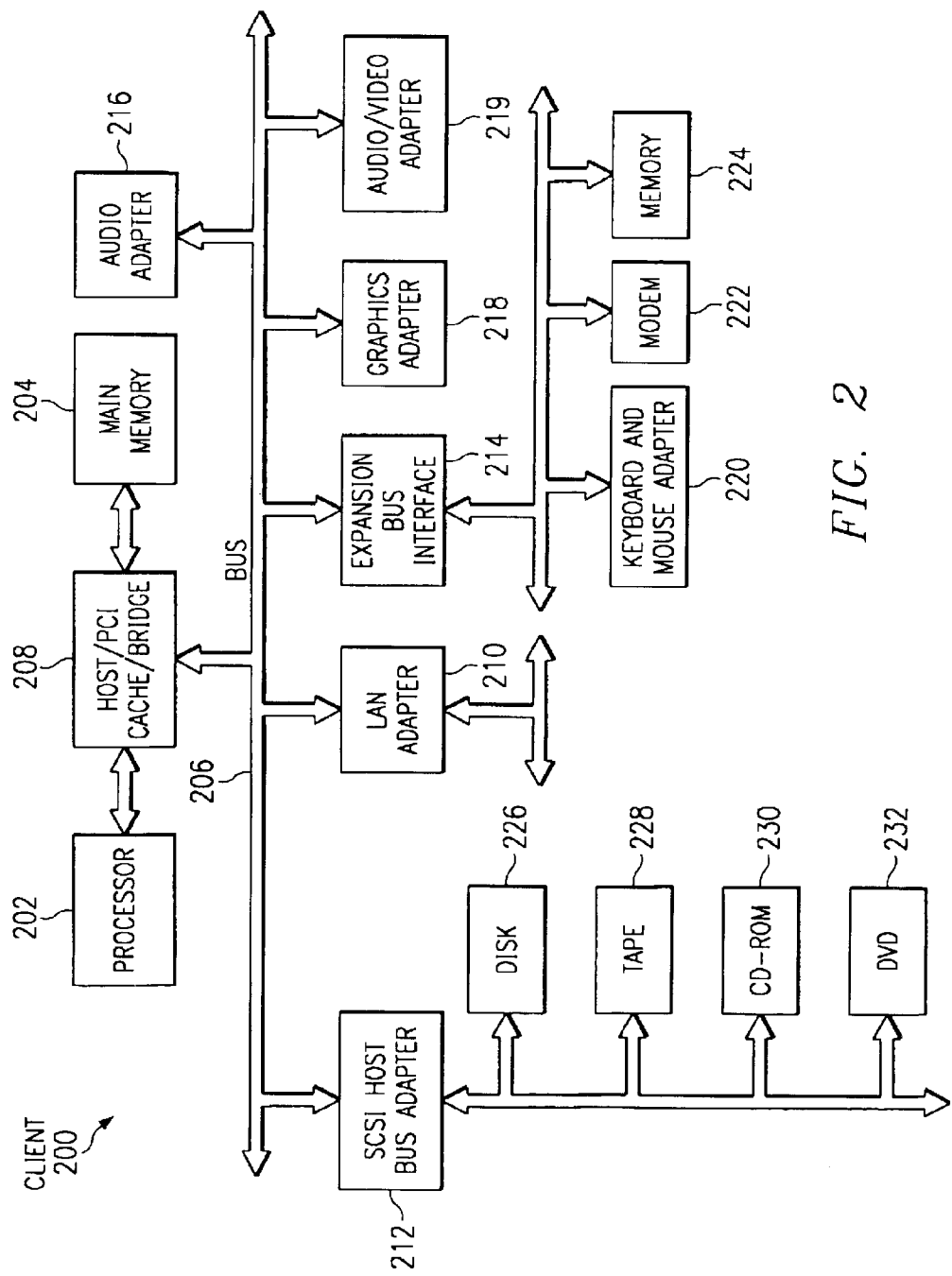
FIG. 2, a block diagram of a data processing system in accordance with the present invention is illustrated.

With reference now to FIG. 2, a block diagram of a data processing system in accordance with the present invention is illustrated. Data processing system 200 is an example of a hardware system console, such as hardware system console 150 depicted in FIG. 1. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by a direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as OS/2, which is available from International Business Machines Corporation. "OS/2" is a trademark of-International Business Machines Corporation. An object oriented programming system, such as Java, may run in conjunction with the operating system, providing calls to the operating system from Java programs or applications executing on data processing system 200. Instructions for the operating system, the object-oriented operating system, and applications or programs are located on a storage device, such as hard disk drive 226, and may be loaded into main memory 204 for execution by processor 202.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention may be applied to multiprocessor data processing systems.

Figure 3:
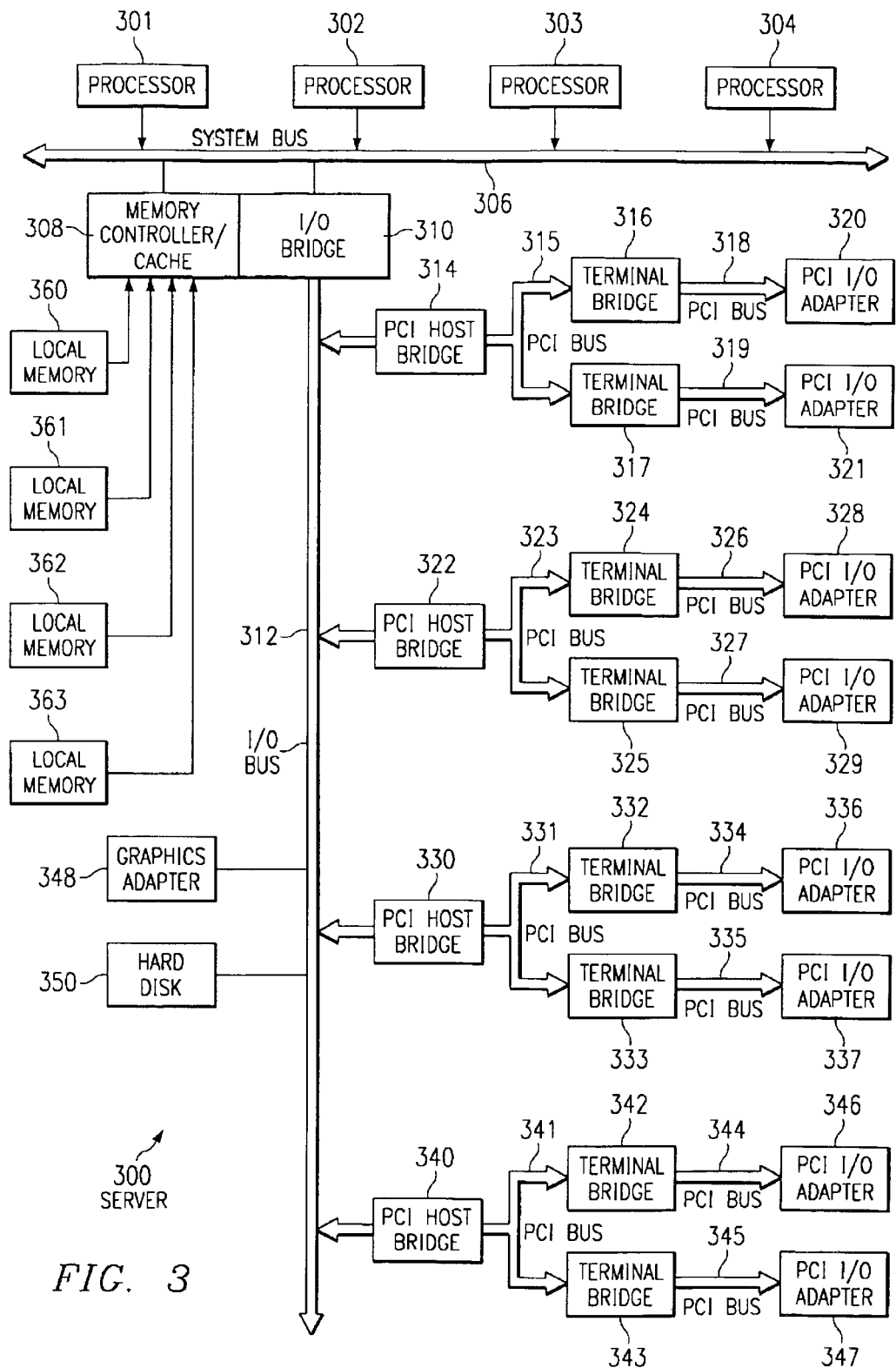
FIG. 3 depicts a block diagram of a data processing system, which may be implemented as a logically partitioned server, in accordance with the present invention.

With reference now to FIG. 3, a block diagram of a data processing system, which may be implemented as a logically partitioned server, such as server 104 in FIG. 1, is depicted in accordance with the present invention. Data processing system 300 may be a symmetric multiprocessor (SMP) system including a plurality of processors 301, 302, 303, and 304 connected to system bus 306. For example, data processing system 300 may be an IBM RS/6000, a product of International Business Machines Corporation in Armonk, New York. Alternatively, a single processor system may be employed. Also connected to system bus 306 is memory controller/cache 308, which provides an interface to a plurality of local memories 360–363. I/O bus bridge 310 is connected to system bus 306 and provides an interface to I/O bus 312. Memory controller/cache 308 and I/O bus bridge 310 may be integrated as depicted.

Data processing system 300 is a logically partitioned data processing system. Thus, data processing system 300 may have multiple heterogeneous operating systems (or multiple instances of a single operating system) running simultaneously. Each of these multiple operating systems may have any number of software programs executing within in it. Data processing system 300 is logically partitioned such that different I/O adapters 320–321, 328–329, 336–337, and 346–347 may be assigned to different logical partitions.

Thus, for example, suppose data processing system 300 is divided into three logical partitions, P1, P2, and P3. Each of I/O adapters 320–321, 328–329, and 336–337, each of processors 301–304, and each of local memories 360–364 is assigned to one of the three partitions. For example, processor 301, memory 360, and I/O adapters 320, 328, and 329 may be assigned to logical partition P1; processors 302–303, memory 361, and I/O adapters 321 and 337 may be assigned to partition P2; and processor 304, memories 362–363, and I/O adapters 336 and 346–347 may be assigned to logical partition P3.

Each operating system executing within data processing system 300 is assigned to a different logical partition. Thus, each operating system executing within data processing system 300 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000™ operating system may be operating within logical partition P1. Windows 2000 is a product and trademark of Microsoft Corporation of Redmond, Wash.

Peripheral component interconnect (PCI) Host bridge 314 connected to I/O bus 312 provides an interface to PCI local bus 315. A number of Terminal Bridges 316–317 may be connected to PCI bus 315. Typical PCI bus implementations will support four Terminal Bridges for providing expansion slots or add-in connectors. Each of Terminal Bridges 316–317 is connected to a PCI/I/O Adapter 320–321 through a PCI Bus 318–319. Each I/O Adapter 320–321 provides an interface between data processing system 300 and input/output devices such as, for example, other network computers, which are clients to server 300. Only a single I/O adapter 320–321 may be connected to each terminal bridge 316–317. Each of terminal bridges 316–317 is configured to prevent the propagation of errors up into the PCI Host Bridge 314 and into higher levels of data processing system 300. By doing so, an error received by any of terminal bridges 316–317 is isolated from the shared buses 315 and 312 of the other I/O adapters 321, 328–329, and 336–337 that may be in different partitions. Therefore, an error occurring within an I/O device in one partition is not "seen" by the operating system of another partition. Thus, the integrity of the operating system in one partition is not effected by an error occurring in another logical partition. Without such isolation of errors, an error occurring within an I/O device of one partition may cause the operating systems or application programs of another partition to cease to operate or to cease to operate correctly.

Additional PCI host bridges 322, 330, and 340 provide interfaces for additional PCI buses 323, 331, and 341. Each of additional PCI buses 323, 331, and 341 are connected to a plurality of terminal bridges 324–325, 332–333, and 342–343 which are each connected to a PCI I/O adapter 328–329, 336–337, and 346–347 by a PCI bus 326–327, 334–335, and 344–345. Thus, additional I/O devices, such as, for example, modems or network adapters may be supported through each of PCI I/O adapters 328–329, 336–337, and 346–347. In this manner, server 300 allows connections to multiple network computers. A memory mapped graphics adapter 348 and hard disk 350 may also be connected to I/O bus 312 as depicted, either directly or indirectly. Hard disk 350 may be logically partitioned between various partitions without the need for additional hard disks. However, additional hard disks may be utilized if desired.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

Figure 4:
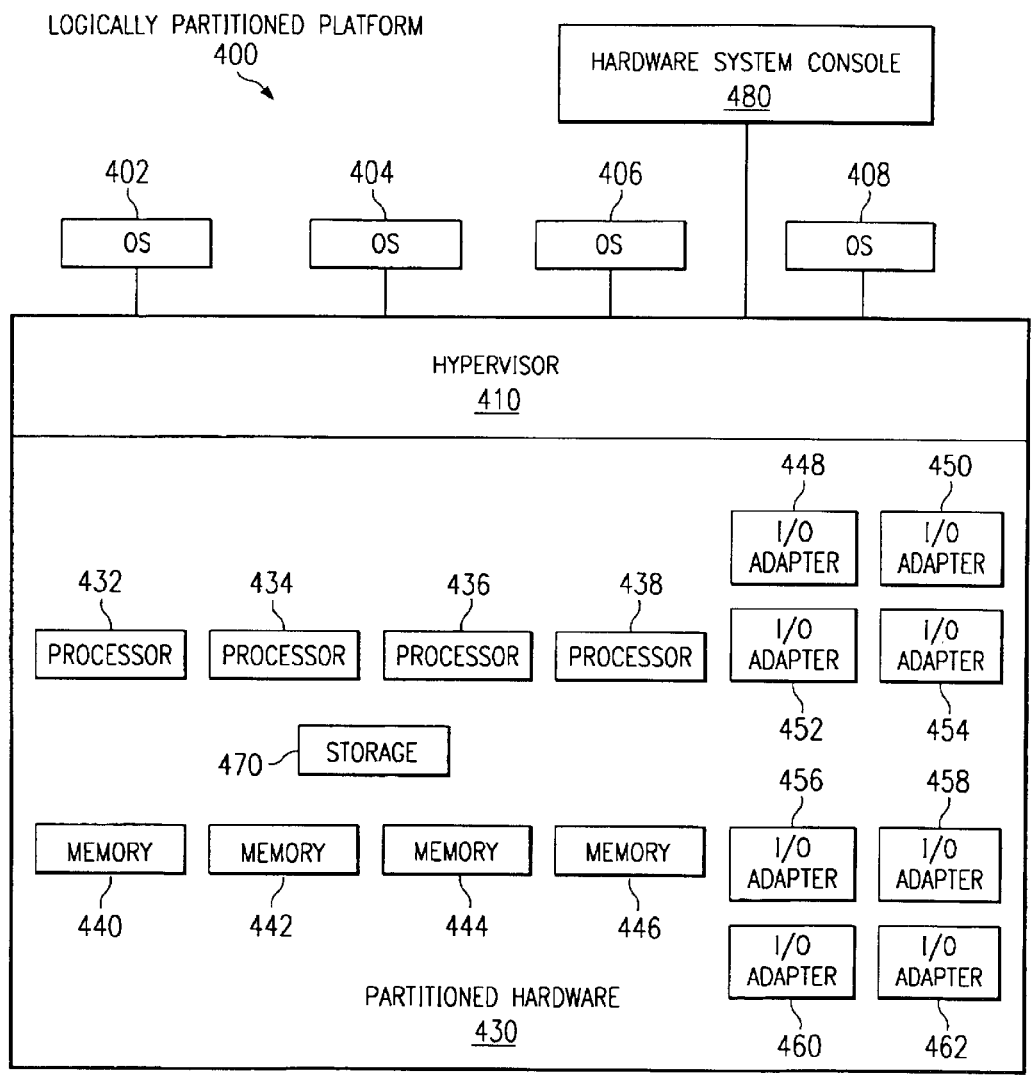
FIG. 4 depicts a block diagram of a logically partitioned platform in which the present invention may be implemented.

With reference now to FIG. 4, a block diagram of an exemplary logically partitioned platform is depicted in which the present invention may be implemented. The hardware in logically partitioned platform 400 may be implemented as, for example, server 300 in FIG. 3. Logically partitioned platform 400 includes partitioned hardware 430, hypervisor 410, and operating systems 402–408. Operating systems 402–408 may be multiple copies of a single operating system or multiple heterogeneous operating systems simultaneously run on platform 400.

Partitioned hardware 430 includes a plurality of processors 432–438, a plurality of system memory units 440–446, a plurality of input/output (I/O) adapters 448–462, and a storage unit 470. Each of the processors 432–438, memory units 440–446, and I/O adapters 448–462 may be assigned to one of multiple partitions within logically partitioned platform 400, each of which corresponds to one of operating systems 402–408.

Hypervisor 410, implemented as firmware, creates and enforces the partitioning of logically partitioned platform 400. Firmware is "hard software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

Hypervisor 410 provides a set of firmware services to each of OS images 402–408 that safely modify the environment of each of OS images 402–408 such that interference between various ones of OS images 402–408 is prevented. Modification of the processor mode of each of processors 432–438 and address translation facilities is precluded by a hardware mode that is only deactivated when one of these hypervisor 410 services are run. Thus, the hypervisor 410 provides a small library of services that provide the richness of flexibility that hardware alone cannot provide without significantly adding to the performance overhead, since the services are firmware clones of those that the OS images would use on a standard non-partitioned platform.

To aid in understanding the present invention, consider the following example of an operating system image requesting to change an entry in a page frame table both in the context of the prior art and in the context of the present invention. A page frame table provides a translation between the logical address assigned to a system resource by an operating system image and the actual physical address of the resource within the data processing system. Each of these resources is assigned to one of OS images 402–408. Thus, each of OS images 402–408 must be prevented from changing an entry in the page frame table corresponding to a resource assigned to a different one of OS images 402–408.

In the prior art firmware trapping method, the firmware protected every location within the page frame table. Every write or read instruction to one of these locations within the page frame table by an operating system image was trapped by the firmware. The firmware then decoded the instruction to determine if the location that the operating system image was attempting to write to or read from corresponded to a resource assigned to that operating system image. If the location did correspond to a resource assigned to that particular operating system image, then the instruction was executed. If the location did not correspond to a resource assigned to that particular operating system image, then the instruction was not executed. Such a procedure requires an enormous amount of overhead to analyze every one of these questionably safe instructions, most of which are safe.

In an embodiment of the present invention, the operating system images are prohibited from writing to the page frame table entirely. However, the functional equivalent of changing an entry in the page frame table is provided by hypervisor 410. Hypervisor 410 determines, in response to a function call from one of OS images 402–408, what the one of OS images 402–408 wishes to change, such as, for example, translating a page from its own memory to an allocated resource, and creates a separate translation table to translate the memory page to the allocated resource. Such a high level translation requires significantly less overhead than tracking every instruction from the OS image. Each OS system image 402–408 running on logical partitioned platform 400 is modified such that rather than request to perform a questionably safe operation, the OS image 402–408 makes a request to the hypervisor 410 for the hypervisor 410 to provide the functional equivalent.

It should be noted that translating a page from memory to an allocated resource is but one example of a "questionably" safe operation. Other "questionably" safe operations to non-assignable resources may be performed by hypervisor 410 to insure that such operations are performed such that interaction with other partitions within the system is prevented.

Hypervisor 410 also may provide the OS images 402–408 running in multiple logical partitions each a virtual copy of a console and operator panel. The interface to the console is changed from an asynchronous teletype port device driver, as in the prior art, to a set of hypervisor firmware calls that emulate a port device driver. The hypervisor 410 encapsulates the data from the various OS images onto a message stream that is transferred to a computer 480, known as a hardware system console.

Hardware system console 480 is connected directly to logically partitioned platform 400 as illustrated in FIG. 4, or may be connected to logically partitioned platform through a network, such as, for example, network 102 in FIG. 1. Hardware system console 480 may be, for example, a desktop or laptop computer, and may be implemented as data processing system 200 in FIG. 2. Hardware system console 480 decodes the message stream and displays the information from the various OS images 402–408 in separate windows, at least one per OS image. Similarly, keyboard input information from the operator is packaged by the hardware system console, sent to logically partitioned platform 400 where it is decoded and delivered to the appropriate OS image via the hypervisor 410 emulated port device driver associated with the then active window on the hardware system console 480.

Those of ordinary skill in the art will appreciate that the hardware and software depicted in FIG. 4 may vary. For example, more or fewer processors and/or more or fewer operating system images may be used than those depicted in FIG. 4. The depicted example is not meant to imply architectural limitations with respect to the present invention.

Figure 5:
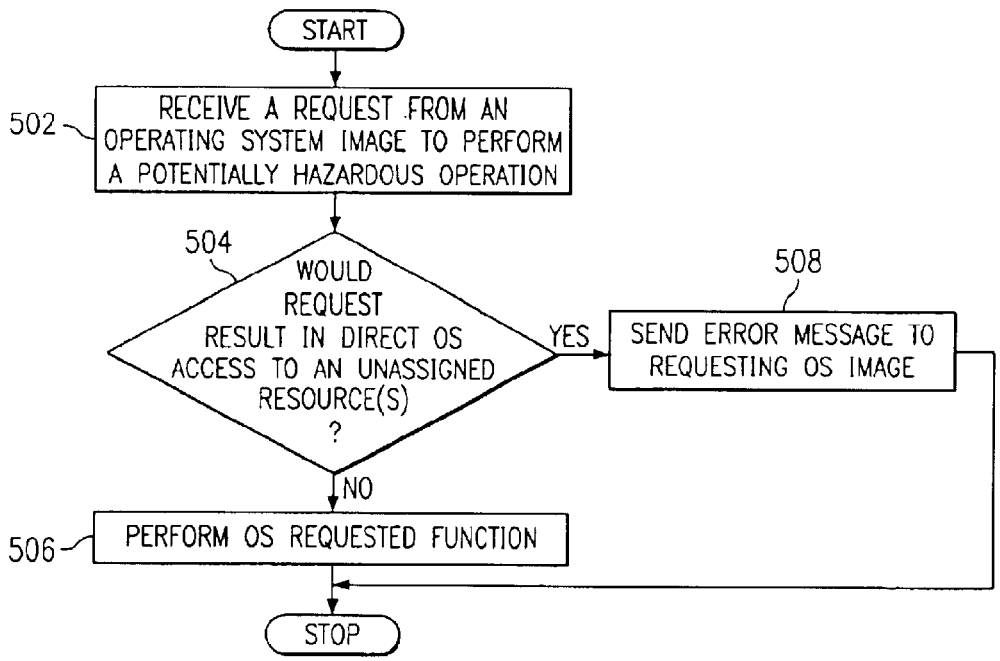
FIG. 5 depicts a flowchart illustrating an exemplary process for preventing each of multiple OS images within a logically partitioned platform from interfering with other OS images in accordance with the present invention.

With reference now to FIG. 5, a flowchart illustrating an exemplary process for preventing each of multiple OS images within a logically partitioned platform from interfering with other OS images is depicted in accordance with the present invention. The hypervisor receives a request from an operating system image to perform a potentially hazardous operation (step 502). The hypervisor then determines if the result of the request would allow the OS direct access to platform resources outside of those allocated to its partition (step 504). For example, the OS may wish to map an existing partition resource to a new memory address. The hypervisor knows this request is safe. If the request would not result in direct OS access to an unassigned resource, then the hypervisor performs the OS requested function (step 506). Continuing the example, the hypervisor then creates a translation table entry to achieve the OS image's desired result. Thus, to map the existing resource to a new memory address, the hypervisor creates a translation table entry to achieve this result. Therefore, as discussed above, a new translation table entry is created rather than allowing the OS image to change an entry or location within the page frame table itself. If, on the other hand, the OS had made a request to map a resource that was not allocated to its partition, the hypervisor would have only returned an error message (step 508).

Figure 6:
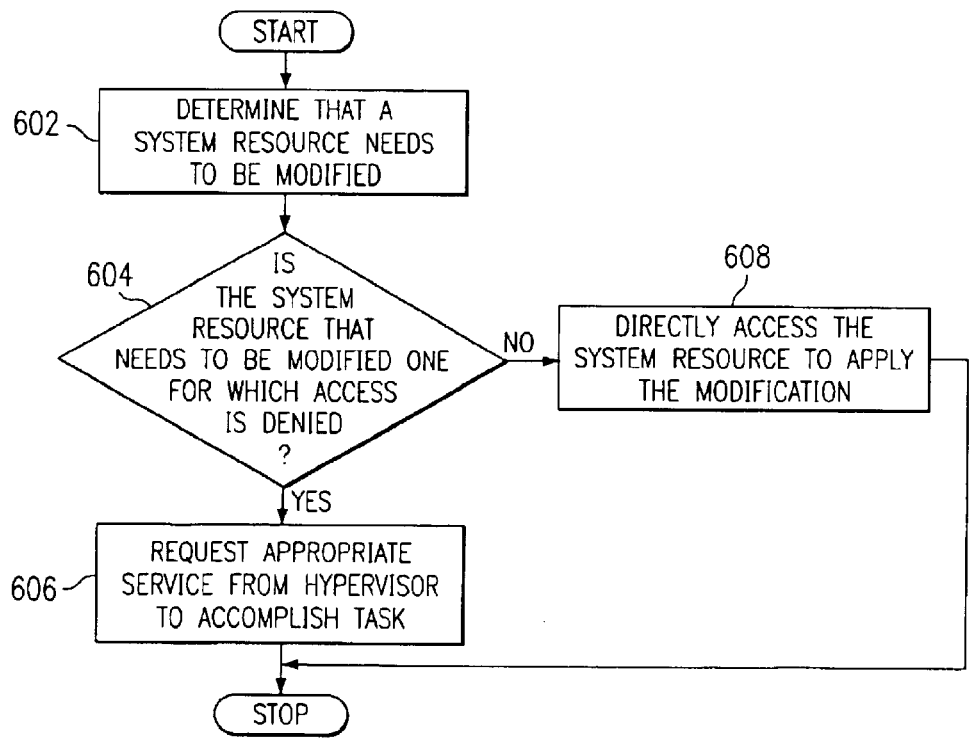
FIG. 6 depicts a high level flowchart illustrating an exemplary process within an operating system image for requesting operations to a logically partitioned platform in accordance with the present invention.

With reference now to FIG. 6, a high level flowchart illustrating an exemplary process within an operating system image for requesting operations to a logically partitioned platform is depicted in accordance with the present invention. The OS image first determines that a system resource needs to be modified to accomplish a task within the OS image (step 602). The OS image then determines whether the system resource that needs to be modified is one for which access is denied by the logically partitioned platform on which the OS image runs (step 604). If access is not denied, then the OS image directly modifies the system resource (step 608). If the system resource is one for which access is denied, then the OS image requests the appropriate service from the hypervisor to achieve the functionally equivalent result of the requested modification (step 606).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A logically partitioned data processing system, comprising:
   a plurality of logical partitions;
   a plurality of operating systems, each assigned to a separate one of the plurality of logical partitions;
   a plurality of assignable resources, wherein each of the plurality of assignable resources is assigned to one of the plurality of logical partitions;
   at least one non-assignable resource;
   a hypervisor, wherein the hypervisor provides a set of services to each of the plurality of logical partitions, one of said set of services performing modifications to the non-assignable resource, in response to an operating system request to directly access said non-assignable resource, without allowing the operating system to directly access the non-assignable resource; and wherein the set of services comprise a service for creating a new translation table for mapping a change in a logical address to a physical address without modifying an existing translation table.

2. The logically partitioned data processing system as recited in claim 1, wherein the existing translation table is a page frame table.

3. The logically partitioned data processing system as recited in claim 1, wherein the non-assignable resource is a page frame table.

4. The logically partitioned data processing system as recited in claim 1, wherein the non-assignable resource is a mode of operation of a processor.

5. The logically partitioned data processing system as recited in claim 1, wherein instructions for executing the hypervisor are contained within firmware.

6. A method for protecting the integrity of a logically partitioned data processing system, the method comprising:
receiving, at a hypervisor, a request from an operating system to perform an operation;
said data processing system including said hypervisor and a platform that includes a plurality of logical partitions, a plurality of operating systems each assigned to a separate one of the plurality of logical partitions, a plurality of assignable resources wherein each of the plurality of assignable resources is assigned to one of the plurality of logical partitions, and at least one non-assignable resource;
providing, by the hypervisor, a set of services, to each of the plurality of logical partitions, that perform modifications to the non-assignable resource without allowing the operating system to directly access the non-assignable resource;
responsive to a determination that the request would not result in direct access by the operating system to said non-assignable resource, performing the operation; and
wherein the request is a request to map a partition resource to a memory address and performing the operation comprises creating a translation table entry to map the memory address to an entry in a page frame table, wherein the entry in the page frame table corresponds to the partition resource.

7. The method as recited in claim 6, further comprising:
responsive to a determination that the request would result in direct access by the operating system to said non-assignable resource, refraining from performing the operation.

8. The method as recited in claim 6, wherein the hypervisor is implemented as firmware.

9. A method executing within a logically partitioned data processing system, the method comprising:
said data processing system including a hypervisor and a platform that includes a plurality of logical partitions, a plurality of operating systems each assigned to a separate one of the plurality of logical partitions, and a non-assignable system resource;
receiving a request from an operating system to directly access said non-assignable system resource to modify said system resource to enable said non-assignable system resource to perform a particular task;
determining whether direct access by said operating system to said non-assignable system resource is permitted;

responsive to a determination that the non-assignable system resource is one for which direct access is denied to the operating system, requesting a service from said hypervisor to perform said particular task, wherein said particular task is performed without permitting said operating system to directly access said non-assignable system resource; and
a service for creating a new translation table for mapping a change in logical address to a physical address without modifying an existing translation table.

10. The method as recited in claim 9, further comprising:
responsive to a determination that the system resource is not one for which direct access is denied to the operating system, directly accessing the system resource to modify said system resource to perform said particular task.

11. The method as recited in claim 9, wherein the hypervisor is implemented as firmware.

12. A computer program product in computer readable media for use in a data processing system for protecting the integrity of a logically partitioned data processing system, the computer program product comprising:
instructions for receiving, at a hypervisor, a request from an operating system to perform an operation;
said data processing system including said hypervisor and a platform that includes a plurality of logical partitions, a plurality of operating systems each assigned to a separate one of the plurality of logical partitions, a plurality of assignable resources wherein each of the plurality of assignable resources is assigned to one of the plurality of logical partitions, and at least one non-assignable resource;
instructions for providing, by the hypervisor, a set of services to each of the plurality of logical partitions that perform modifications to the non-assignable resource, in response to an operating system request to access said non-assignable resource, without allowing the operating system to directly access the non-assignable resource; and
instructions, responsive to a determination that the request would not result in direct access by the operating system to said non-assignable resource, for performing the operation; and
wherein the request is a request to map a partition resource to a memory address and performing the operation comprises creating a translation table entry to map the memory address to an entry ina page frame table, wherein the entry in the page frame table corresponds to the partition resource.

13. The computer program product as recited in claim 12, further comprising:
instructions, responsive to a determination that the request would result in direct access by the operating system to said non-assignable resource, for refraining from performing the operation.

14. The computer program product as recited in claim 12, wherein the hypervisor is implemented as firmware.

15. A computer program product in a computer readable media for use in a logically partitioned data processing system for providing modification of system resources by an operating system executing within the logically partitioned data processing system, the computer program product comprising:
said data processing system including a hypervisor and a platform that includes a plurality of logical partitions, a plurality of operating systems each assigned to a separate one of the plurality of logical partitions, and a non-assignable system resource;

instructions for receiving a request from an operating system to directly access said non-assignable system resource to modify said non-assignable system resource to enable said non-assignable system resource to perform a particular task;

instructions for determining whether direct access by said operating system to said non-assignable system resource is permitted;

instructions, responsive to a determination that the non-assignable system resource is one for which direct access is denied to the operating system, for requesting a service from said hypervisor to perform said particular task, wherein said particular task is performed without permitting said operating system to directly access said non-assignable system resource; and wherein a set of services comprise a service for creating a new translation table for mapping a change in a logical address to a physical address without modifying an existing translation table.

16. The computer program product as recited in claim 15, further comprising:

instructions, responsive to a determination that the system resource is not one for which direct access is denied to the operating system, for directly accessing the system resource to modify said system resource to perform said particular task.

17. The computer program product as recited in claim 15, wherein the hypervisor is implemented as firmware.

18. The computer program product as recited in claim 15, wherein the computer program product comprises an operating system.

19. A system for protecting the integrity of a logically partitioned data processing system, the system comprising:

means for receiving, at a hypervisor, a request from an operating system to perform an operation;

said data processing system including said hypervisor and a platform that includes a plurality of logical partitions, a plurality of operating systems each assigned to a separate one of the plurality of logical partitions, a plurality of assignable resources wherein each of the plurality of assignable resources is assigned to one of the plurality of logical partitions, and at least one non-assignable resource;

said hypervisor for providing a set of services to each of the plurality of logical partitions that perform modifications to the non-assignable resource, in response to an operating system request to access said non-assignable resource, without allowing the operating system to directly access the non-assignable resource;

means, responsive to a determination that the request would not result in direct access by the operating system to said non-assignable resource, for performing the operation; and wherein the request is a request to map a partition resource to a memory address and performing the operation comprises creating a translation table entry to map the memory address to an entry in a page frame table, wherein the entry in the page frame table corresponds to the partition resource.

20. The system as recited in claim 19, further comprising:

means, responsive to a determination that the request would result in direct access by the operating system to said non-assignable resource, for refraining from performing the operation.

21. The system as recited in claim 19, wherein the hypervisor is implemented as firmware.

22. A system for providing for modification of system resources by an operating system within a logically partitioned data processing system, the system comprising:

means for determining that a system resource needs to be modified;

said data processing system including a hypervisor and a platform that includes a plurality of logical partitions, a plurality of operating systems each assigned to a separate one of the plurality of logical partitions, and a non-assignable system resource;

means for receiving a request from an operating system to directly access said non-assignable system resource to modify said system resource to enable said non-assignable system resource to perform a particular task;

means for determining whether direct access by said operating system to said non-assignable system resource is permitted;

means, responsive to a determination that the non-assignable system resource is one for which direct access is denied to the operating system, for requesting a service from said hypervisor to perform said particular task, wherein said particular task is performed without permitting said operating system to directly access said non-assignable system resource; and wherein a set of services comprise a service for creating a new translation table for mapping a change in a logical address to a physical address without modifying an existing translation table.

23. The system as recited in claim 22, further comprising:

means, responsive to a determination that the system resource is not one for which direct access is denied to the operating system, for directly accessing the system resource to modify said system resource to perform said particular task.

24. The system as recited in claim 22, wherein the hypervisor is implemented as firmware.

* * * * *

UNITED STATES PATENT AND TRADEMARK OFFICE
CERTIFICATE OF CORRECTION

PATENT NO.         : 7,003,771 B1                                  Page 1 of 1
APPLICATION NO. : 09/589663
DATED                  : February 21, 2006
INVENTOR(S)       : Arndt It is certified that error appears in the above-identified patent and that said Letters Patent is hereby corrected as shown below:

Col. 4, line 63:  after "memories" delete "360-364" and insert --360-363--.

Col. 9, line 64:  before "system" insert --non-assignable--.

Col. 10, line 9:  after "change in" insert --a--.

Col. 10, line 38:  after "resource;" delete "and".

Col. 10, line 46:  after "entry" delete "ina" and insert --in a--.

Signed and Sealed this

Second Day of January, 2007

JON W. DUDAS
*Director of the United States Patent and Trademark Office*